US 12,202,557 B2

United States Patent
Söderström (10) Patent No.: US 12,202,557 B2
(45) Date of Patent: Jan. 21, 2025

(54) ARRANGEMENT OF A DRIVE WHEEL FOR AN ENDLESS TRACK OF A TRACKED VEHICLE

(71) Applicant: BAE Systems Hägglunds Aktiebolag, Örnsköldsvik (SE)

(72) Inventor: Gustav Söderström, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 454 days.

(21) Appl. No.: 17/619,115

(22) PCT Filed: Jun. 4, 2020

(86) PCT No.: PCT/SE2020/050566
§ 371 (c)(1),
(2) Date: Dec. 14, 2021

(87) PCT Pub. No.: WO2020/251449
PCT Pub. Date: Dec. 17, 2020

(65) Prior Publication Data
US 2022/0250695 A1   Aug. 11, 2022

(30) Foreign Application Priority Data

Jun. 14, 2019 (SE) .................... 1950722-7

(51) Int. Cl.
*B62D 55/13* (2006.01)
*B62D 55/32* (2006.01)
(52) U.S. Cl.
CPC ............. *B62D 55/13* (2013.01); *B62D 55/32* (2013.01)
(58) Field of Classification Search
CPC ...... B62D 55/13; B62D 55/12; B62D 55/125; B62D 55/135; B62D 55/32
See application file for complete search history.

(56) References Cited

U.S. PATENT DOCUMENTS 937,111 A    10/1909 Sparr
1,298,597 A  * 3/1919 Strait ..................... B62D 55/12
                                                    305/117
(Continued)

FOREIGN PATENT DOCUMENTS

EP    2088063 A2    8/2009
IT    UB20161181 A1    8/2017
(Continued)

OTHER PUBLICATIONS

Russian Search Report for Russian Application No. 2022100122 mailed on Nov. 3, 2023, 4 pages. English translation.
(Continued)

*Primary Examiner* — Kip T Kotter
(74) *Attorney, Agent, or Firm* — Morrison & Foerster LLP (57) ABSTRACT

The present invention relates to an arrangement (A) of a drive wheel (DW) for an endless track (E) of a tracked vehicle (V). The drive wheel (DW) comprises a hub member (H) and a drive sprocket member (S1, S2) attached to the hub member (H). Said drive sprocket member (S1, S2) comprises a ring shaped drive sprocket (10) having a set of teeth (12) arranged around the circumference of said drive sprocket (10). Said drive sprocket (10) is configured to engage with said endless track (E). Said drive sprocket member (S1, S2) further comprises a support member (20) for said drive sprocket (10). Said drive sprocket (10) is divided into at least two arc shaped drive sprocket parts (10A, 10B). Each drive sprocket part (10A, 10B), in a non engaged state of a drive sprocket part with respect to said endless track, is configured to be exchangeable. Said arrangement (A) comprises a guiding configuration (G1, G2) comprising a first guiding member (G1) circumferentially distributed around the support member (20) and a second guiding member (G2) circumferentially distributed
(Continued)

around the respective drive sprocket part (10A, 10B) for facilitating reassembling the drive sprocket (10). The present invention also relates to a tracked vehicle.

6 Claims, 5 Drawing Sheets

(56) References Cited

U.S. PATENT DOCUMENTS

| | | | | |
|---|---|---|---|---|
| 3,083,585 | A * | 4/1963 | Dawe | F16H 55/30 |
| | | | | 474/96 |
| 3,439,551 | A | 4/1969 | Militana | |
| 3,472,090 | A * | 10/1969 | Dawe | B62D 55/135 |
| | | | | 74/447 |
| 4,043,214 | A * | 8/1977 | Westlake | F16H 55/12 |
| | | | | 74/447 |
| 4,472,164 | A * | 9/1984 | Pusch | F16H 55/30 |
| | | | | 74/DIG. 10 |
| 4,506,934 | A | 3/1985 | Hammond | |
| 5,026,329 | A * | 6/1991 | Diekevers | B62D 55/135 |
| | | | | 474/162 |
| 5,636,911 | A * | 6/1997 | Korpi | F16H 7/06 |
| | | | | 305/193 |
| 6,074,316 | A * | 6/2000 | Murrietta, Sr. | F16H 55/30 |
| | | | | 474/96 |
| 7,823,990 | B2 * | 11/2010 | Angot | B62D 55/20 |
| | | | | 305/195 |
| 2004/0012260 | A1 * | 1/2004 | Yamamoto | B62D 55/088 |
| | | | | 305/167 |
| 2004/0053722 | A1 * | 3/2004 | Oertley | F16H 55/12 |
| | | | | 474/162 |
| 2005/0075206 | A1 * | 4/2005 | Kabrich | B62D 55/12 |
| | | | | 474/162 |
| 2011/0101135 | A1 | 5/2011 | Korus et al. | |
| 2013/0038119 | A1 * | 2/2013 | Griffith | B62D 55/13 |
| | | | | 29/525.01 |

FOREIGN PATENT DOCUMENTS

| | | |
|---|---|---|
| JP | 2013001127 A | 1/2013 |
| KR | 20110058586 A | 6/2011 |
| RU | 192369 U1 | 9/2019 |
| RU | 221010 U1 | 10/2023 |
| WO | WO-2004011323 A1 | 2/2004 |
| WO | WO-2019/051003 A1 | 3/2019 |
| WO | WO-2019050957 A1 | 3/2019 |

OTHER PUBLICATIONS

Singaporean Search Report and Opinion for Singaporean Application No. 11202113078U completed on Feb. 26, 2024, 4 pages.
International Search Report and Written Opinion for International Application No. PCT/SE2020/050566 mailed on Oct. 6, 2020, 11 pages.
Swedish Search Report for Swedish Application No. SE1950722-7 mailed on Dec. 12, 2019, 8 pages.
Extended European Search Report and Written Opinion received for European Patent Application No. 20823520.0 mailed on Jun. 13, 2023, 9 pages.

* cited by examiner

ARRANGEMENT OF A DRIVE WHEEL FOR AN ENDLESS TRACK OF A TRACKED VEHICLE

CROSS REFERENCE TO RELATED APPLICATIONS

This application is a national stage application under 35 U.S.C. § 371 of International Application No. PCT/SE2020/050566, filed internationally on Jun. 4, 2020, which claims priority to SE 1950722-7, filed Jun. 14, 2019, the entire contents of each are incorporated by reference herein.

TECHNICAL FIELD

The present invention relates to an arrangement of a drive wheel for an endless track of a tracked vehicle. The present invention also relates to a tracked vehicle comprising drive wheels having such an arrangement.

BACKGROUND

Tracked vehicles may be equipped with opposite track assemblies. Each track assembly comprises an endless track arranged to run over a set of wheels comprising a drive wheel, a tension wheel and a set of road wheels there between.

A drive wheel may be equipped with a hub member and an inner drive sprocket and an outer drive sprocket connected to the respective side of the hub member.

Wear on drive wheels may be relatively large, depending on environment in which such tracked vehicles are used. When using endless tracks of rubber, exchange of drive wheels need to be performed in a workstation, where the each drive sprocket of the drive wheel needs to be removed. Thus, when the tracked vehicle is not in access of a workstation and there is a need to exchange a drive wheel due to wear on drive sprockets a problematic situation may occur.

There is a need for providing an arrangement of a drive wheel for an endless track which facilitates maintenance of the drive wheel.

OBJECTS OF THE INVENTION

An object of the present invention is to provide an arrangement of a drive wheel for an endless track which facilitates maintenance of the drive wheel.

A further object of the present invention is to provide a vehicle comprising such an arrangement.

SUMMARY OF THE INVENTION

These and other objects, apparent from the following description, are achieved by an arrangement and a vehicle, as set out in the appended independent claims. Preferred embodiments of the arrangement are defined in appended dependent claims.

According to the invention the objects are achieved by an arrangement of a drive wheel for an endless track of a tracked vehicle. The drive wheel comprises a hub member and a drive sprocket member attached to the hub member. Said drive sprocket member comprises a ring shaped drive sprocket having a set of teeth arranged around the circumference of said drive sprocket. Said drive sprocket is configured to engage with said endless track. Said drive sprocket member further comprises a support member for said drive sprocket. Said drive sprocket is divided into at least two arc shaped drive sprocket parts, each drive sprocket part, in a non engaged state of a drive sprocket part with respect to said endless track, being configured to be exchangeable. Said arrangement comprises a guiding configuration comprising a first guiding member circumferentially distributed around the support member and a second guiding member circumferentially distributed around the respective drive sprocket part for facilitating reassembling the drive sprocket.

By thus providing such a guiding configuration, radial control in connection to assembling/reassembling of the drive sprocket is obtained. By means of such a first guiding member of the support member and second guiding member of the respective drive sprocket part, the drive sprocket and hence each drive sprocket part may be directed to a correct radial position relative to the support member during assembly/reassembly of drive sprocket parts to the support member. Thus, hereby maintenance of the drive wheel is facilitated. Further, such a guiding configuration will take up radial load on the drive wheel when the drive wheel is assembled on the tracked vehicle. Such a guiding configuration may also facilitate manufacturing of the drive wheels. By thus providing such a divided drive sprocket, maintenance of the drive wheel is facilitated in that radial control in connection to assembling/reassembling of the drive sprocket is obtained, wherein a sprocket part may be assembled independently of how it is rotated relative to the support member, thus facilitating reducing vehicle downtime.

According to an embodiment of the arrangement one of said first and second guiding members is a recess and the other of said first and second guiding members is a protrusion configured to engage with said recess. Hereby guiding of the sprocket parts when assembling/reassembling the sprocket parts on the support member is facilitated. Hereby correct radial position of the respective sprocket part relative to the support member is facilitated.

According to an embodiment of the arrangement said recess is a circumferentially running groove and said protrusion is a circumferentially running ridge. Hereby guiding of the sprocket parts when assembling/reassembling the sprocket parts on the support member is facilitated. Hereby correct radial position of the respective sprocket part relative to the support member is facilitated. By thus having the protrusion and recess running circumferentially a sprocket part may be assembled independently of how it is rotated relative to the support member.

According to an embodiment of the arrangement one of said first and second guiding members is arranged on one side of the support member and the other of said first and second guiding members is opposingly arranged on the respective drive sprocket part. Hereby guiding of the sprocket parts when assembling/reassembling the sprocket parts on the support member is facilitated. Hereby correct radial position of the respective sprocket part relative to the support member is facilitated.

According to an embodiment of the arrangement each arc shaped drive sprocket part, where the drive sprocket is divided, has a first end portion and a second end portion, each end portion of a drive sprocket part being configured to connect with an end portion of another drive sprocket part so as to form said drive sprocket, said arrangement further comprising a connecting configuration comprising a first connecting member arranged in connection to an end portion of a drive sprocket part and a second connecting member arranged in connection to an end portion of another drive sprocket part intended to connect with the first connecting member for facilitating reassembling the drive sprocket. By thus providing such a connecting configuration, radial and axial control in connection to assembling/reassembling of the drive sprocket is obtained. By means of such a first and second connecting members at end portions of drive sprocket parts the drive sprocket parts may be easily directed to a correct position relative to each other during assembly/reassembly of drive sprocket parts to the support member so that the drive sprocket parts of the drive sprocket are correctly aligned relative to each other when applied onto the support member of the drive wheel.

According to an embodiment of the arrangement one of said first and second connecting members is a recess and the other of said first and second connecting members is a protrusion configured to engage with said recess. Hereby guiding of the sprocket parts relative to each other when assembling/reassembling the sprocket parts on the support member is facilitated. Hereby correct alignment both radially and axially of the sprocket parts relative to each other is facilitated.

According to an embodiment of the arrangement said drive wheel comprises an outer drive sprocket member arranged on the outer side of the hub member and an inner drive sprocket member arranged on the inner side of the hub member.

According to the invention the objects are achieved by a tracked vehicle comprising an arrangement as set out herein.

DESCRIPTION OF THE DRAWINGS

For a better understanding of the present invention reference is made to the following detailed description when read in conjunction with the accompanying drawings, wherein like reference characters refer to like parts throughout the several views, and in which.

DETAILED DESCRIPTION

Herein the term "rubber" in relation to "rubber track" refers to any elastic material such as rubber, elastomers or combinations of rubber and elastomers.

According to an aspect of the present disclosure an arrangement of a drive wheel for an endless track of a tracked vehicle is provided. The arrangement is an arrangement for facilitating exchange and reassembling of a drive sprocket of a drive wheel of a tracked vehicle. The arrangement is an arrangement for facilitating exchange and reassembling of a respective drive sprocket part of the drive wheel.

Such a tracked vehicle may comprise a right track assembly and a left track assembly for driving the vehicle. Such a tracked vehicle may alternatively be a tracked vehicle with a single track assembly. Each track assembly may comprise a drive wheel, a tension wheel, a set of road wheels and an endless track arranged to run over said wheels. The endless track of the respective track assembly may be arranged to be driven and hence rotated by means of said drive wheel. The tracked vehicle may comprise drive means for driving said drive wheels. The drive means may be any suitable drive means such as one or more internal combustion engines and/or one or more electric machines.

The endless track of the respective track assembly may have any suitable configuration and be of any suitable material. The endless track of the respective track assembly may according to an aspect of the present disclosure be a rubber track. The endless track of the respective track assembly may according to an aspect of the present disclosure be a steel track.

The drive wheel comprises a hub member and a drive sprocket member attached to the hub member. Said drive sprocket member comprises a ring shaped drive sprocket having a set of teeth arranged around the circumference of said drive sprocket.

Said drive sprocket is configured to engage with said endless track. Said set of teeth of said drive sprocket are configured to engage with said endless track.

Said drive sprocket member further comprises a support member for said drive sprocket. Said support member of the drive wheel may be configured to be attached to the hub member. Said support member of the drive wheel may be configured to be attached to the hub member by means of joint members, e.g. screw joint members.

Said drive sprocket may be configured to be attached to the support member. Said drive sprocket may be configured to be attached to the support member by means of joint members, e.g. screw joint members.

Said drive sprocket is divided into at least two arc shaped drive sprocket parts, each drive sprocket part, in a non engaged state of a drive sprocket part with respect to said endless track, being configured to be exchangeable.

When said drive wheel is arranged at the tracked vehicle a portion of the teeth of the drive sprocket may be engaged with the endless track. When said drive wheel is arranged at the tracked vehicle a portion of the teeth of one drive sprocket part may be engaged with the endless track, and another drive sprocket part may be at a rotated position of the drive wheel so that it is not engaged with the endless track and may thus be removed and exchanged. The drive wheel may then be rotated to another rotated position of the drive wheel so that another drive sprocket part is rotated so that it is not engaged with the endless track and may thus be removed and exchanged.

Said arrangement comprises a guiding configuration comprising a first guiding member circumferentially distributed around the support member and a second guiding member circumferentially distributed around the respective drive sprocket part for facilitating reassembling the drive sprocket. Said arrangement thus comprises a guiding configuration comprising a first guiding member circumferentially distributed around the support member and a second guiding member circumferentially distributed around the respective drive sprocket part for facilitating reassembling one or more of the drive sprocket parts to the support member. Said arrangement comprises a guiding configuration comprising a first guiding member circumferentially distributed around the support member and a second guiding member circumferentially distributed around the respective drive sprocket part for facilitating assembling the drive sprocket and hence one or more of drive sprocket parts of the drive sprocket. A drive sprocket part being assemble/reassembled may be a new drive sprocket part replacing a damaged/broken drive sprocket part or the same drive sprocket part that was removed, which e.g. has been repaired.

Said first guiding member circumferentially distributed around the support member and second guiding member circumferentially distributed around the respective drive sprocket part are configured so that radial control in connection to assembling/reassembling of the drive sprocket is obtained. Said first guiding member circumferentially distributed around the support member and second guiding member circumferentially distributed around the respective drive sprocket part are configured so that the drive sprocket and hence each drive sprocket part may be directed to a correct radial position relative to the support member during assembly/reassembly of drive sprocket parts to the support member.

According to an aspect of the present disclosure one of said first and second guiding members is a recess and the other of said first and second guiding members is a protrusion configured to engage with said recess.

According to an aspect of the present disclosure said recess is a circumferentially running groove and said protrusion is a circumferentially running ridge. According to an embodiment said circumferentially running groove has a certain cross sectional shape, e.g. U-shape, V-shape, arc-shape or the like, and said circumferentially running ridge has a cross sectional shape, e.g. rectangular shape, triangular shape, arc shape or the like, configured to at least partly fit in and thus engage with the groove and thus having an essentially corresponding reversed shape.

According to an aspect of the present disclosure one of said first and second guiding members is arranged on one side of the support member and the other of said first and second guiding members is opposingly arranged on the respective drive sprocket part. According to an embodiment of the arrangement one of said first and second guiding members is arranged on one side of the support member and the other of said first and second guiding members is arranged on a side of the drive sprocket, i.e. arranged on a side of the respective drive sprocket part.

According to an aspect of the present disclosure one of said first and second guiding members comprises a set of circumferentially distributed openings/holes and the other of said first and second guiding members comprises a set of circumferentially distributed taps engagable with said openings/holes.

According to an aspect of the present disclosure each arc shaped drive sprocket part, where the drive sprocket is divided, has a first end portion and a second end portion. Each end portion of a drive sprocket part may be configured to connect with an end portion of another drive sprocket part so as to form said drive sprocket.

According to an aspect of the present disclosure said arrangement further comprises a connecting configuration comprising a first connecting member arranged in connection to an end portion of a drive sprocket part and a second connecting member arranged in connection to an end portion of another drive sprocket part intended to connect with the first connecting member for facilitating reassembling the drive sprocket. Said arrangement thus comprises a connecting configuration comprising a first connecting member arranged in connection to an end portion of a drive sprocket part and a second connecting member arranged in connection to an end portion of another drive sprocket part intended to connect with the first connecting member for facilitating reassembling the drive sprocket to the support member.

Said first connecting member arranged in connection to an end portion of a drive sprocket part and a second connecting member arranged in connection to an end portion of another drive sprocket part are configured such that radial and axial control in connection to assembling/reassembling of the drive sprocket is obtained.

Said first connecting member arranged in connection to an end portion of a drive sprocket part and a second connecting member arranged in connection to an end portion of another drive sprocket part are configured such that the drive sprocket parts may be easily directed to a correct position relative to each other during assembly/reassembly of drive sprocket parts to the support member so that the drive sprocket parts of the drive sprocket are correctly aligned relative to each other when applied onto the support member of the drive wheel.

According to an aspect of the present disclosure one of said first and second connecting members is a recess and the other of said first and second connecting members is a protrusion configured to engage with said recess. According to an embodiment said recess has certain cross sectional shape, e.g. U-shape, V-shape, arc-shape or the like, and said protrusion has a cross sectional shape, e.g. rectangular shape, triangular shape, arc shape or the like, configured to at least partly fit in and thus engage with the recess and thus having an essentially corresponding reversed shape. According to an embodiment said recess is a groove and said protrusion is a ridge, said groove and ridge respectively having an extension essentially parallel to the axial extension of an imaginary axis of its respective arc shaped drive sprocket part. According to an embodiment said recess is a blind hole and said groove is a tap configured to fit in said hole.

According to an aspect of the present disclosure said drive wheel comprises an outer drive sprocket member arranged on the outer side of the hub member and an inner drive sprocket member arranged on the inner side of the hub member.

For a tracked vehicle with a single track assembly having a single drive wheel, the drive wheel comprises a hub member and a drive sprocket member attached to the hub member. In this case the drive wheel may comprise a first drive sprocket member arranged on one side of the hub member and a second drive sprocket member arranged on the opposite side of the hub member. The hub member hereby has a first side configured to face out from one side of the vehicle and an opposite second side configured to face out from the opposite side of the vehicle, when the drive wheel is mounted to the single track assembly of the vehicle.

Figure 1:
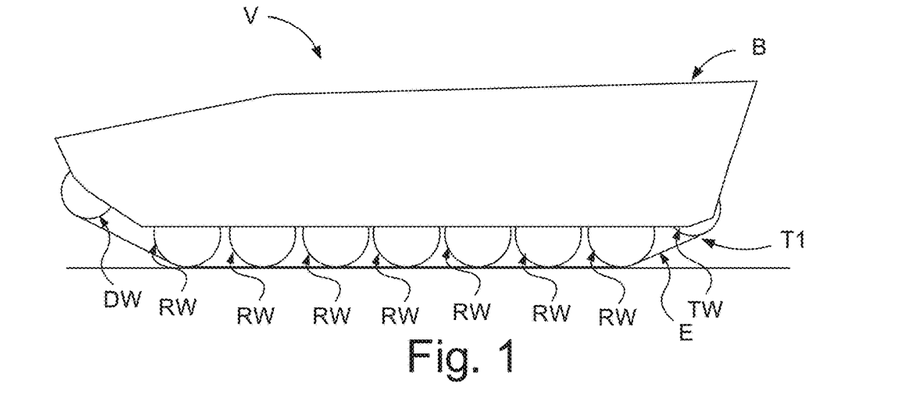
FIG. 1 schematically illustrates a side view of a tracked vehicle according to an embodiment of the present disclosure.

FIG. 1 schematically illustrates a side view of a tracked vehicle V according to an embodiment of the present disclosure.

The vehicle V is according to the disclosure in FIG. 1 a military vehicle.

The tracked vehicle V comprises a vehicle body B, which according to an aspect of the present disclosure comprises the chassis of the vehicle V and bodywork.

The tracked vehicle V comprises a right track assembly T1 and a left track assembly for driving the vehicle V, the right track assembly being shown in FIG. 1. Each track assembly comprises a drive wheel DW, a tension wheel TW, a set of road wheels RW and an endless track E arranged to run over said wheels. Here the drive wheel DW is arranged in the front, the tension wheel TW is arranged in the back and the road wheels RW are arranged between the drive wheel DW and the tension wheel TW. The tracked vehicle according to the present disclosure may however have track assemblies with any suitable arrangement of drive wheel, tension wheel and road wheels. According to an aspect of the present disclosure the tension wheel may be arranged in the front, the drive wheel arranged in the back and the road wheels arranged there between.

The endless track E of the respective track assembly is arranged to be driven and hence rotated by means of said drive wheel DW. The tracked vehicle V comprises a drive means, not shown, for driving said drive wheels DW. The drive means may be any suitable drive means such as an internal combustion engine and/or an electric machine.

The endless track of the respective track assembly may have any suitable configuration and be of any suitable material. The endless track E of the respective track assembly is according to an aspect of the present disclosure a rubber track. The endless track of the respective track assembly may according to an aspect of the present disclosure be a steel track.

Figure 2:
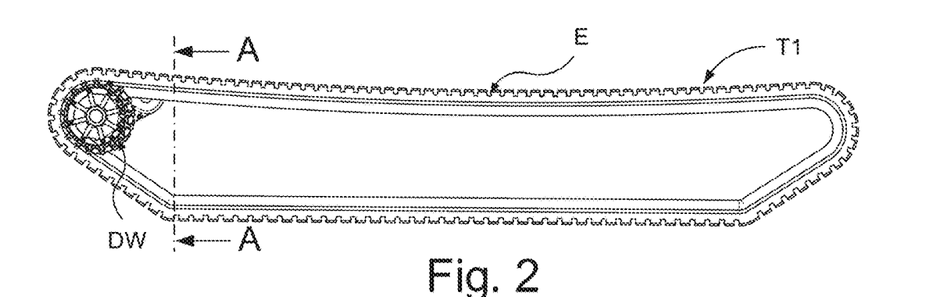
FIG. 2 schematically illustrates a side view of a track assembly of a tracked vehicle according to an embodiment of the present disclosure.

FIG. 2 schematically illustrates a side view of a track assembly T1 of a tracked vehicle according to an embodiment of the present disclosure. The track assembly T1 comprises a drive wheel DW and an endless track E arranged to run over said drive wheel DW. The track assembly T1 may comprise tension wheel and road wheels, not shown.

Figure 3A:
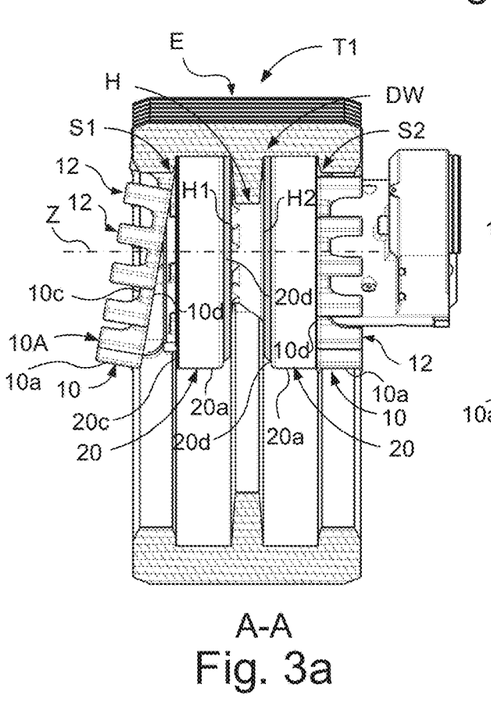
FIG. 3a-b schematically illustrates cross sectional views of the track assembly in FIG. 2 showing a drive wheel for the endless track of the track assembly according to an embodiment of the present disclosure.
Figure 3B:
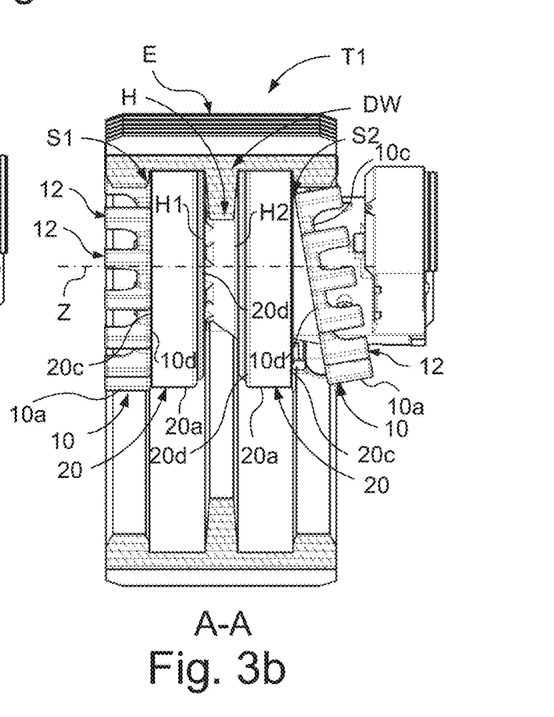
Figure 4:
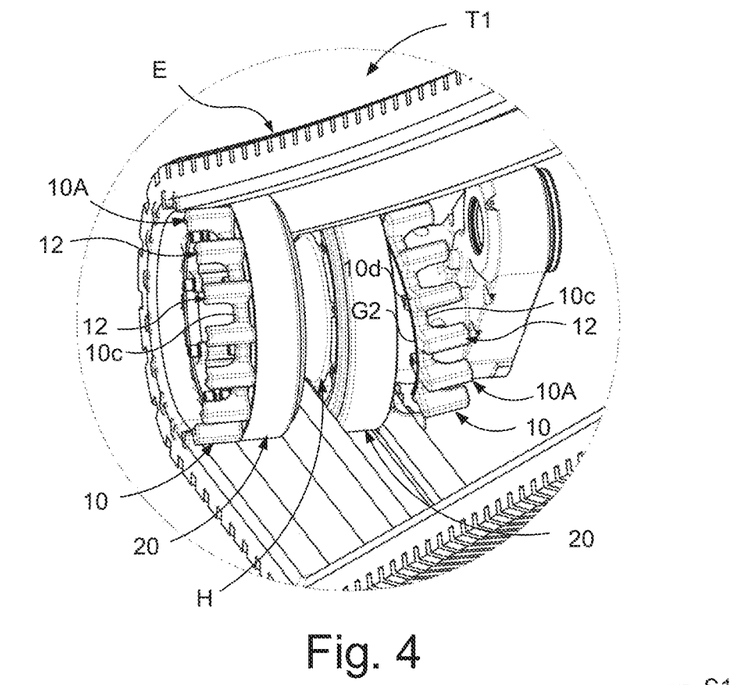
FIG. 4 schematically illustrates a perspective view of the drive wheel and portion of the track in FIG. 3b according to an embodiment of the present disclosure.
Figure 5:
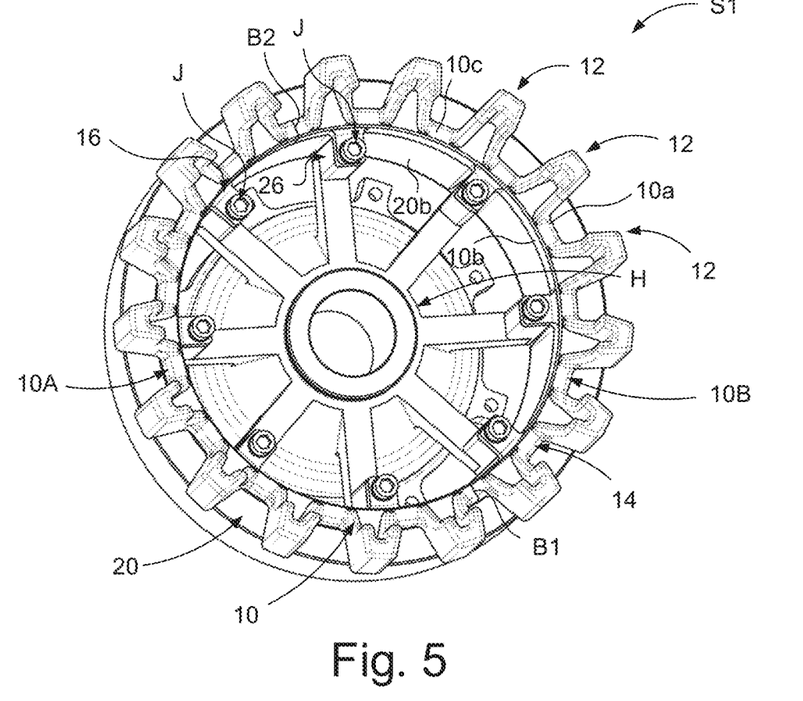
FIG. 5 schematically illustrates a perspective view of a part of the drive wheel in FIG. 4 according to an embodiment of the present disclosure.

FIG. 3a-b schematically illustrates cross sectional views A-A of the track assembly T1 in FIG. 2 showing a drive wheel DW for the endless track E of the track assembly T1 according to an embodiment of the present disclosure. FIG. 4 schematically illustrates a perspective view of the drive wheel DW and portion of the track E in FIG. 3b according to an embodiment of the present disclosure. FIG. 5 schematically illustrates a perspective view of a part of the drive wheel in FIG. 4 according to an embodiment of the present disclosure.

The drive wheel DW has a centre axis Z, see FIG. 3a-b. The drive wheel DW comprises a hub member H. The hub member H is configured to be operably engaged with the drive axle of the drive means of the tracked vehicle and configured to be rotated by the drive means. The hub member H is thus arranged to rotate about the centre axis Z, see FIG. 3a-b.

The hub member H has according to this embodiment spokes. The hub member according to the present disclosure may have any suitable configuration. The drive means may according to an aspect of the present disclosure, not shown, be arranged in connection to the drive wheel such that the drive means, e.g. an electric machine, at least partly is accommodated within the periphery of the drive wheel, the drive means axle essentially coaxially coinciding with the centre axis Z of the drive wheel.

According to an aspect of the present disclosure said hub member H has a first side H1 and an opposite second side H2. According to the embodiment of the present disclosure illustrated in e.g. FIG. 3a-b, for a tracked vehicle having right track assembly and a left track assembly for driving the vehicle, the first side constitutes a front side H1 configured to face out from the vehicle, i.e. side of the vehicle, and the opposite second side constitutes a rear side H2 is configured to face towards the vehicle.

According to an aspect of the present disclosure, the hub member H has a front side H1 and an opposite rear side H2, see FIG. 3a-b. The front side H1 is configured to face out from the vehicle and the rear side H2 is configured to face towards the vehicle.

According to an aspect of the present disclosure said drive wheel DW comprises a first drive sprocket member S1 arranged on the first side H1 of the hub member H and an opposite second drive sprocket member S2 arranged on the opposite second side H2 of hub member H. According to the embodiment of the present disclosure illustrated in e.g. FIG. 3a-b, for a tracked vehicle having right track assembly and a left track assembly for driving the vehicle, the first drive sprocket member S1 constitutes an outer drive sprocket member S1 arranged on the front side H1 of the hub member H and the second drive sprocket member S2 constitutes an inner drive sprocket member S2 arranged on the rear side H2 of the hub member H.

According to an aspect of the present disclosure said drive wheel DW comprises an outer drive sprocket member S1 arranged on the front side H1 of the hub member H and an inner drive sprocket member S2 arranged on the rear side H2 of the hub member H.

The respective drive sprocket member S1, S2 comprises a ring shaped drive sprocket 10. Each ring shaped drive sprocket 10 has a set of teeth 12 arranged around the circumference of the drive sprocket 12. The drive sprocket 10 of the respective drive sprocket member S1, S2 is configured to engage with said endless track E. Said teeth 12 of said drive sprocket 10 of the respective drive sprocket member S1, S2 is configured to engage with said endless track E.

Said teeth are 12 configured to engage with an endless track of the tracked vehicle.

The respective drive sprocket member S1, S2 comprises a support member 20 for the respective drive sprocket 10. According to this embodiment, the outer drive sprocket member S1 comprises a support member 20 for the drive sprocket 10 of said outer drive sprocket member S1. According to this embodiment, the inner drive sprocket member S2 comprises a support member for the drive sprocket 10 of said inner drive sprocket member S2.

The support member 20 of the respective drive sprocket member S1, S2 has, according to the embodiment in FIGS. 2 and 3, a ring shaped configuration. The support member 20 of the respective drive sprocket member S1, S2 has an outer side 20a and an opposite inner side 20b.

The support member 20 of the respective drive sprocket member S1, S2 has a front side 20c and an opposite rear side 20d.

The front side 20c of the support member 20 of the outer drive sprocket S1 is configured to face away from the front side H1 of the hub member H when attached to the hub member H. The front side 20c of the support member 20 of the inner drive sprocket S2 is configured to face away from the rear side H2 of the hub member H when attached to the hub member H.

The rear side 20d of the support member 20 of the outer drive sprocket S1 is configured to face towards the front side H1 of the hub member H when attached to the hub member H. The rear side 20d of the support member 20 of the inner drive sprocket S2 is configured to face towards the rear side H2 of the hub member H when attached to the hub member H.

The support member 20 of the respective drive sprocket S1, S2 is configured to be attached to the hub member. The support member 20 of the respective drive sprocket S1, S2 is, according to an aspect of the present disclosure, a single portion configured to be attached to the hub member H and configured to receive drive sprocket 10 of the respective drive sprocket member S1, S2.

The support member 20 of the outer drive sprocket S1 is configured to be attached to the hub member H in connection to the first side H1, here front side H1 of the hub member H. The support member 20 of the inner drive sprocket S2 is configured to be attached to the hub member H in connection to the second side H2, here rear side H2 of the hub member H.

The drive sprocket 10 of the respective drive sprocket member S1, S2 has an outer side 10a and an opposite inner side 10b.

The drive sprocket 10 of the respective drive sprocket member S1, S2 has a front side 10c and an opposite rear side 10d.

The front side 10c of the drive sprocket 10 of the outer drive sprocket member S1 is configured to face away from the front side 20c of the support member 20 of the outer drive sprocket member S1 when attached to the support member 20. The front side 10c of the drive sprocket 10 of the inner drive sprocket member S2 is configured to face away from the front side 20c of the support member 20 of the inner drive sprocket member S2 when attached to the support member 20 of the inner drive sprocket member S2. The teeth 12 of the drive sprocket 10 are configured to protrude from the front side 10c.

The rear side 10d of the drive sprocket 10 of the outer drive sprocket member S1 is configured to face towards the front side 20c of the support member 20 of the outer drive sprocket member S1 when attached to the support member 20. The rear side 10d of the drive sprocket 10 of the inner drive sprocket member S2 is configured to face towards the front side 20c of the support member 20 of the inner drive sprocket member S2 when attached to the support member 20.

The drive sprocket 10 of the respective drive sprocket member S1, S2 of the drive wheel DW comprises a base portion 14. The base portion 14 has an arc shape. The base portion 14 comprises said outer side 10a, opposite inner side 10b, said front side 10c and said rear side 10d. The teeth 12 are configured to project from said base portion 14 on the outer side 10a and from the front side 10c.

The drive sprocket 10 of the respective drive sprocket member S1, S2 of the drive wheel DW comprises a base portion 14.

According to this embodiment the drive sprocket 10 of the respective drive sprocket member S1, S2 comprises a set of fastening members 16 arranged around the inner side 10b of the respective ring shaped drive sprocket 10, see FIG. 5 showing the set of fastening members 16 for the outer drive sprocket member S1. The respective fastening member 16 comprises or is arranged to receive a bolt joint J for attaching the drive sprocket 10 to the support member 20 of the respective drive sprocket member S1, S2 of the drive wheel DW. The number of bolt joints for attaching the drive sprocket to the support member of the respective drive sprocket member may be any suitable number and may vary depending on e.g. configuration of the tracked vehicle.

According to this embodiment the fastening members 16 are attached to corresponding fastening members 26 of the support member 20 by means of said bolt joints J. Thus, the support member 20 of the respective drive sprocket member S1, S2 comprises a set of fastening members 26 arranged around the inner side 20b of the respective ring shaped support member 20.

The drive sprocket 10 of the respective drive sprocket member S1, S2 of the drive wheel DW is according to this embodiment divided into two arc shaped drive sprocket parts 10A, 10B, a first arc shaped drive sprocket part 10A and a second arc shaped drive sprocket part 10B, see FIG. 5. Depending on e.g. number of teeth the respective arc shaped drive sprocket part may be the same article or different articles. In FIG. 3a-b and FIG. 4 the first drive sprocket part 10A is visible. The first arc shaped drive sprocket part 10A and the second arc shaped drive sprocket part 10B are configured to be connected to each other at its respective end portions. When the arc shaped drive sprocket parts 10A, 10B are connected, said drive sprocket 10 is formed. When the arc shaped drive sprocket parts 10A, 10B are connected a first border B1 is formed where the first end portion of the respective drive sprocket parts 10A, 10B are connected and a second border B2 formed where the second end portion of the respective drive sprocket parts 10A, 10B are connected, see FIG. 5.

Each drive sprocket part 10A, 10B, in a non engaged state of a drive sprocket part with respect to said endless track E, is configured to be exchangeable. Thus, the drive sprocket with the respective drive sprocket part 10A, 10B is configured such that, in a certain rotational position of the drive wheel DW, one of the drive sprocket parts will not be engaged with the endless track E, which facilitates removing that drive sprocket part. By then rotating the endless track E so that the drive wheel DW is rotated to a certain new rotational position, the other drive sprocket part will not be engaged with the endless track and my thus also be removed.

In FIG. 3a the first drive sprocket part 10A of the drive sprocket 10 of the outer drive sprocket member S1 is being removed from the support member 20. In FIG. 3b the first drive sprocket part 10A of the drive sprocket 10 of the inner drive sprocket member S2 is being removed from the support member 20.

Figure 6A:
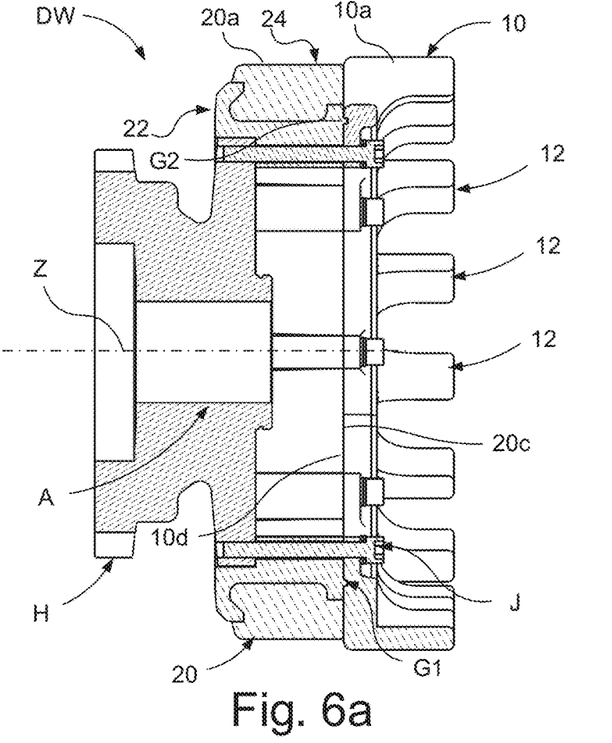
FIG. 6a schematically illustrates a cross sectional view of a the part of the drive wheel in FIG. 5 according to an embodiment of the present disclosure.
Figure 6B:
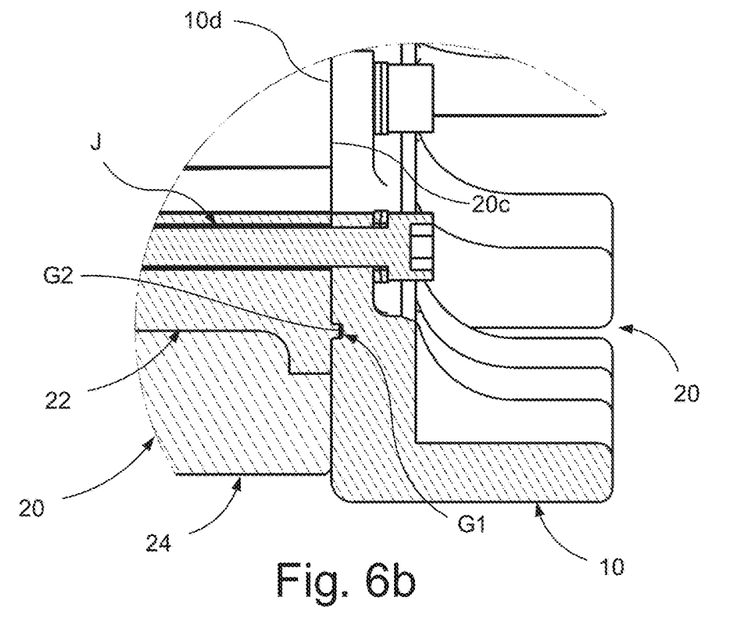
FIG. 6b schematically illustrates a cross sectional view of a portion of the part of the drive wheel in FIG. 6a according to an embodiment of the present disclosure.

FIG. 6a schematically illustrates a cross sectional view of the part of the drive wheel OW in FIG. 5 according to an embodiment of the present disclosure; and FIG. 6b schematically illustrates a cross sectional view of a portion of the part of the drive wheel DW in FIG. 6a according to an embodiment of the present disclosure.

The drive axle A of the drive wheel DW is illustrated in FIG. 6a. The drive shaft A is configured to rotate the drive wheel DW about the axis Z by means of the drive arrangement of the vehicle.

Figure 7:
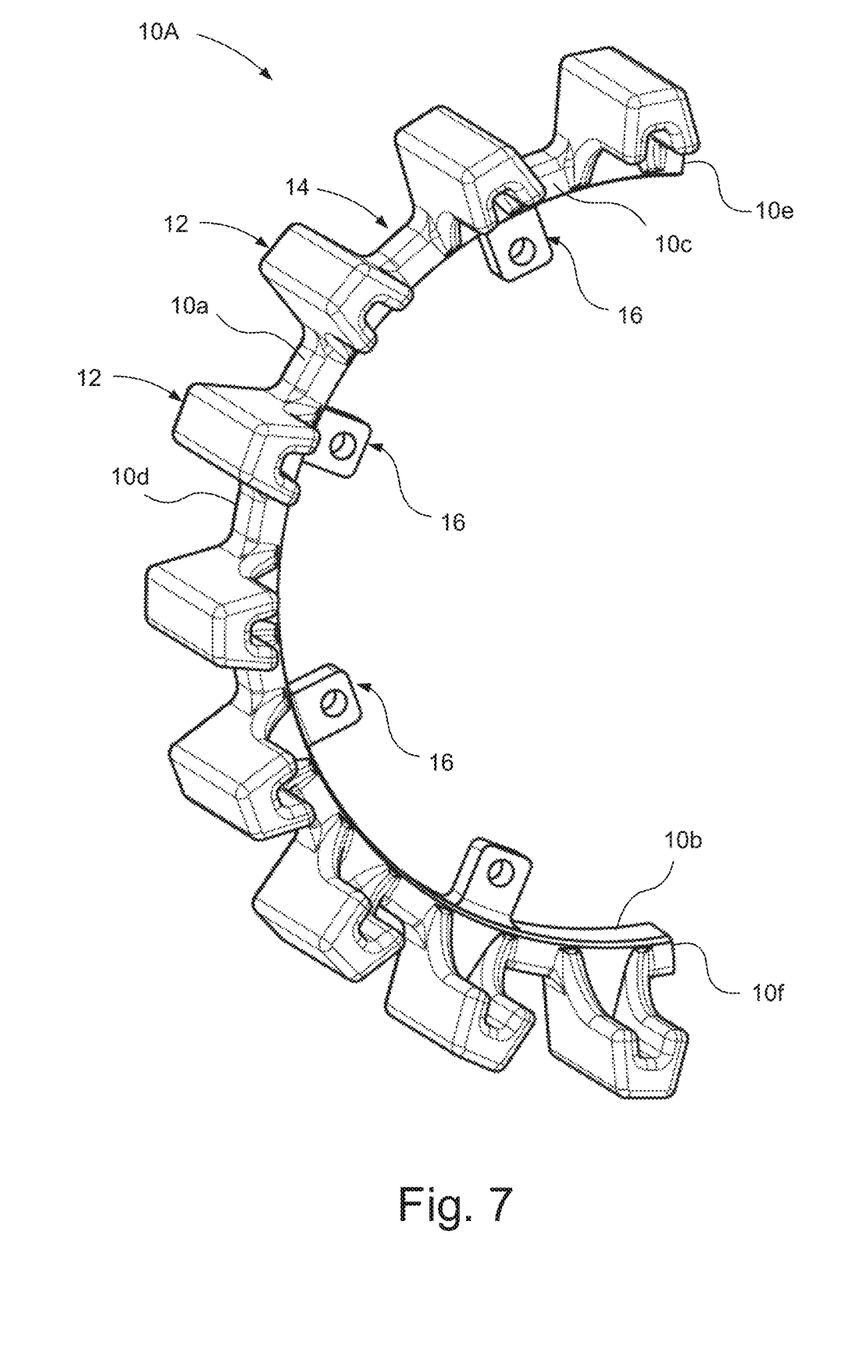
FIG. 7 schematically illustrates a perspective view of an arc shaped drive sprocket part according to an embodiment of the present disclosure.
Figure 8A:
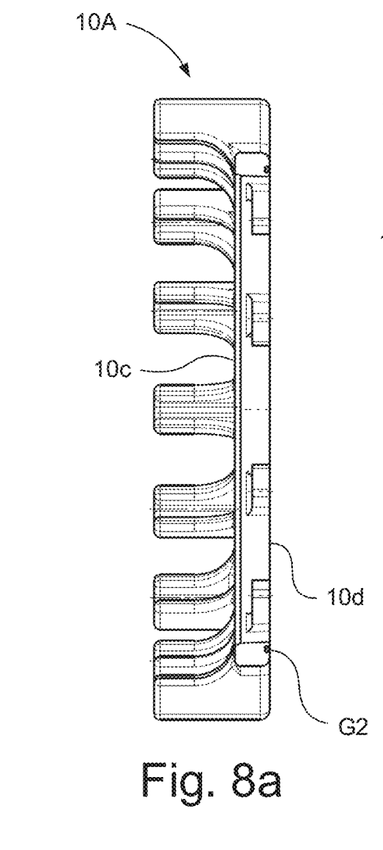
FIG. 8a schematically illustrates a side view of the arc shaped drive sprocket part in FIG. 7 according to an embodiment of the present disclosure.
Figure 8B:
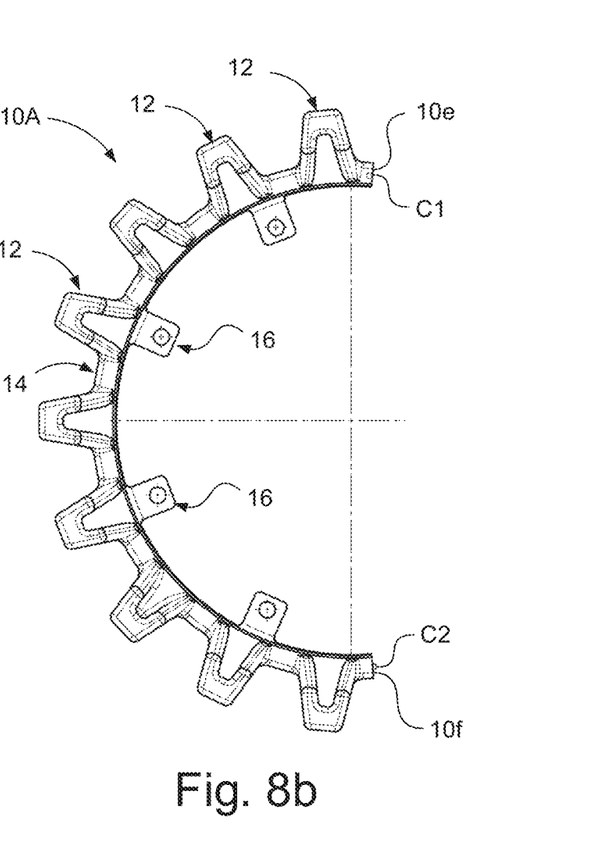
FIG. 8b schematically illustrates a front view of the arc shaped drive sprocket part in FIG. 7 according to an embodiment of the present disclosure.
Figure 8C:
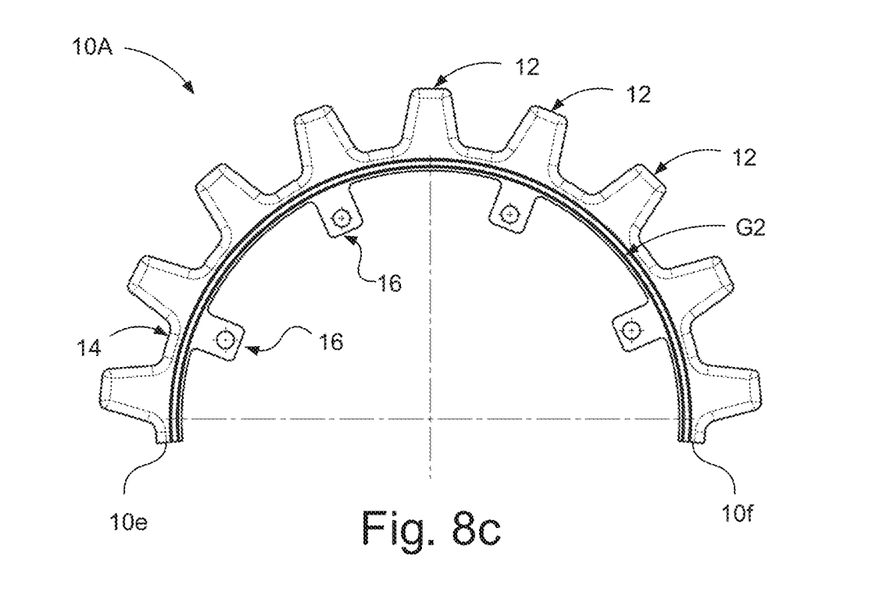
FIG. 8c schematically illustrates a rear view of the arc shaped drive sprocket part in FIG. 7 according to an embodiment of the present disclosure.

FIG. 7 schematically illustrates a perspective view of an arc shaped drive sprocket part according to an embodiment of the present disclosure; FIG. 8a schematically illustrates a side view of the arc shaped drive sprocket part in FIG. 7 according to an embodiment of the present disclosure; FIG. 8b schematically illustrates a front view of the arc shaped drive sprocket part in FIG. 7 according to an embodiment of the present disclosure; and FIG. 8c schematically illustrates a rear view of the arc shaped drive sprocket part in FIG. 7 according to an embodiment of the present disclosure.

Each arc shaped drive sprocket part 10A, 10B has, as mentioned above a first end portion 10e and a second end portion 10f configured to provide said borders B1, B2 when the drive sprocket parts forming the drive sprocket 10 are attached on the support member 20 of the drive wheel DW. The first end portion 10e and the second end portion 10f of the arc shaped drive sprocket 10A is illustrated in FIG. 7 and FIG. 8b-c.

When the arc shaped drive sprocket parts 10A, 10B are connected a first border B1 is formed where the first end portion of the respective drive sprocket parts 10A, 10B are connected and a second border B2 formed where the second end portion of the respective drive sprocket parts 10A, 10B are connected, see FIG. 5.

The present disclosure comprises an arrangement of a drive wheel. The arrangement is an arrangement for facilitating exchange and reassembling of the drive sprocket 10 of the drive wheel DW. The arrangement is an arrangement for facilitating exchange and reassembling of the respective drive sprocket part 10A, 10B of the drive wheel DW.

Said arrangement comprises a guiding configuration G1, G2 for facilitating exchange and reassembling of the drive sprocket 10 and hence the respective drive sprocket part 10A, 10B of the drive wheel DW.

Said guiding configuration G1, G2 comprises a first guiding member G1 circumferentially distributed around the support member 20.

Said guiding configuration G1, G2 comprises a second guiding member G2 circumferentially distributed around the respective drive sprocket part and hence the drive sprocket 10 for facilitating reassembling the drive sprocket 10.

According to an embodiment of the arrangement one of said first and second guiding members G1, G2 is a recess and the other of said first and second guiding members G1, G2 is a protrusion configured to engage with said recess. According to the embodiment disclosed with reference to e.g. FIG. 6a-b the first guiding member G1 arranged on the respective support member 20 is a protrusion G1. According to the embodiment disclosed with reference to e.g. FIG. 6a-b the second guiding member G2 arranged on the respective drive sprocket 10 is a recess G2.

According to this embodiment of the arrangement said protrusion G1 is a circumferentially running ridge G1 running around the front side 20c of the support member 20.

Thus, according to this embodiment of the arrangement said protrusion G1 is configured to run in an arc shaped track, i.e. an arc shaped ridge G1 on the front side 20c of the support member 20, following the ring shaped extension of the support. According to this embodiment of the arrangement said protrusion G1 is configured to run in a circle, i.e. an circular ridge G1 on the front side 20c of the support member 20, following the ring shape of the support member 20.

According to this embodiment of the arrangement said recess G2 is a circumferentially running groove G2 running around the rear side 10d of the drive sprocket 10, i.e. the rear side 10d of the respective drive sprocket part 10A, 10B, see also FIG. 8a and FIG. 8c. Thus, according to this embodiment of the arrangement said recess G2 is configured to run in an arc shaped track, i.e. an arc shaped groove G2 on the rear side 10d of the respective drive sprocket part 10A, 10B, following the arc shaped extension of the respective drive sprocket part 10A, 10B. The groove G2 of the respective drive sprocket part 10A, 10B is configured to run in an arc shaped track such that, when the sprocket parts 10A, 10B are connected so that the ring shaped drive sprocket 10 with the first and second borders B1, B2 is formed, the grooves G2 are configured to coincide so that a circular groove G2 is formed on the rear side of the drive sprocket 10.

The recess G2, e.g. groove G2, may have any suitable cross section configured to receive said protrusion G2 of the support member 20. The recess G2 may have any suitable polygonal cross section. The recess G2 may according to an embodiment have an arc shaped cross section. The recess G2 may according to an embodiment have a U-shaped cross section. The recess G2 may according to an embodiment have a V-shaped cross section. The recess G2 may according to an embodiment have a rectangular-shaped, e.g. square-shaped, cross section.

The protrusion G1, e.g. ridge G1, may have any suitable cross section configured to receive the recess G2 of the respective sprocket part 10A, 10B of the sprocket 10 having a corresponding cross section. The ridge G2 may have any suitable polygonal cross section. The ridge G1 may according to an embodiment have an arc shaped cross section configured to at least partly fit into a recess G2 of the respective sprocket part 10A, 10B having a corresponding arc-shaped cross section. The ridge G1 may according to an embodiment have a rectangular cross section configured to at least partly fit into a recess G2 of the respective sprocket part 10A, 10B having a corresponding U-shaped cross section. The ridge G1 may according to an embodiment have a triangular cross section configured to at least partly fit into a recess G2 of the respective sprocket part 10A, 10B having a corresponding V-shaped cross section.

According to an embodiment of the arrangement, not shown, one of said first and second guiding members comprises a set of circumferentially distributed openings/holes and the other of said first and second guiding members comprises a set of circumferentially distributed taps engagable with said openings/holes.

As mentioned above the first end portion 10e and a second end portion 10f of the respective arc shaped drive sprocket part 10A, 10B, see FIG. 7 and FIG. 8b-c, is configured to provide said borders B1, B2, see FIG. 5, when the drive sprocket parts forming the drive sprocket 10 are attached on the support member 20 of the drive wheel DW.

The first end portion 10e and a second end portion 10f of the respective arc shaped drive sprocket part 10A, 10B thus provides the borders where the drive sprocket 10 is divided.

The arrangement for facilitating exchange and reassembling of the respective drive sprocket part 10A, 10B of the drive wheel DW may according to an aspect of the present disclosure further comprise a connecting configuration C1, C2 comprising a first connecting member C1 arranged in connection to an end portion of a drive sprocket part and a second connecting member C2 arranged in connection to an end portion of another drive sprocket part intended to connect with the first connecting member C1 for facilitating reassembling the drive sprocket.

According to an embodiment of the arrangement one of said first and second connecting members C1, C2 is a recess and the other of said first and second connecting members C1, C2 is a protrusion configured to engage with said recess. According to an embodiment said recess has certain cross sectional shape, e.g. U-shape, V-shape, arc-shape or the like, and said protrusion has a cross sectional shape, e.g. rectangular shape, triangular shape, arc shape or the like, configured to at least partly fit in and thus engage with the recess and thus having an essentially corresponding reversed shape. According to an embodiment said recess is a groove and said protrusion is a ridge, said groove and ridge respectively having an extension essentially parallel to the axial extension of an imaginary axis of its respective arc shaped drive sprocket part. According to an embodiment said recess is a blind hole and said groove is a tap configured to fit in said hole.

FIG. 8b schematically illustrates an exemplary embodiment of the present disclosure in which the first arc shaped drive sprocket part 10A has a first connecting member C1 arranged in connection to the first end portion 10e and a second connecting member C2 arranged in connection to the second end portion 10f. The first connecting member C1 is according to this example a recess C1 and the second connecting member C2 is according to this example a protrusion C2.

With the first arc shaped drive sprocket part 10A having a connecting configuration C1, C2 according to FIG. 8b, the second arc shaped sprocket part 10B would then be arranged with a connecting configuration C1, C2 with a first connecting member C1 arranged in connection to the first end portion 10e in the shape of a recess C1 and a second connecting member C2 in the shape of a protrusion C2. Hereby the recess C1 at the first end portion 10e of the first drive sprocket part 10A would engage with the protrusion C2 at the second end portion 10f of the second drive sprocket part 10B and the protrusion C2 at the second end portion 10f of the first drive sprocket part 10A would engage with the recess C1 at the first end portion 10e of the second drive sprocket part 10B, thus forming the drive sprocket 10 when assembled.

Alternatively, not shown, the first arc shaped drive sprocket part 10A could have a first connecting member C1, e.g. a recess, in connection to both the first end portion 10e and the second end portion 10f, wherein the second arc shaped drive sprocket part 10B would have a second connecting member C2, e.g. a protrusion, in connection to both the first end portion 10e and the second end portion 10f for engagement with the first connecting members C1.

FIG. 6a schematically illustrates a cross sectional view of a the part of the drive wheel DW in FIG. 5, showing the hub member H, a support member 20 and a drive sprocket 10 according to an embodiment of the present disclosure. According to this embodiment the support member 20 has a base part 22 and a peripheral part 24. The base part 22 comprises according to this embodiment the second guiding member G2 in the shape of said circumferential running ridge G2 running on the front side 20c of the support member 20. The peripheral part 24 is according to this embodiment configured to surround and run around the base part 22. The peripheral part 24 comprises according to this embodiment the outer side 20a of the support member 20. By thus dividing the support member 20 into a base part 22 and a peripheral part 24 said parts 22, 24 may be made of different materials.

According to an embodiment the base part 22 is made of steel and the peripheral part 24 is made of a plastic material. Hereby the weight of the drive wheel DW may be reduced. Further, improved durability may be obtained in certain environmental conditions. This may also lead to less packaging of snow and ice in winter conditions.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

Below some general aspects of the arrangement and the tracked vehicle according to the present disclosure are listed.

Aspect 1: An arrangement A of a drive wheel DW for an endless track E of a tracked vehicle V, the drive wheel DW comprising a hub member H and a drive sprocket member S1, S2 attached to the hub member H, said drive sprocket member S1, S2 comprising a ring shaped drive sprocket 10 having a set of teeth 12 arranged around the circumference of said drive sprocket 10, said drive sprocket 10 being configured to engage with said endless track E, said drive sprocket member S1, S2 further comprising a support member 20 for said drive sprocket 10, said drive sprocket 10 being divided into at least two arc shaped drive sprocket parts 10A, 10B, each drive sprocket part 10A, 10B, in a non engaged state of a drive sprocket part with respect to said endless track E, being configured to be exchangeable, wherein each arc shaped drive sprocket part 10A, 10B, where the drive sprocket 10 is divided, has a first end portion 10e and a second end portion 10f, each end portion of a drive sprocket part being configured to connect with an end portion of another drive sprocket part so as to form said drive sprocket 10, said arrangement A further comprising a connecting configuration C1, C2 comprising a first connecting member C1 arranged in connection to an end portion of a drive sprocket part and a second connecting member C2 arranged in connection to an end portion of another drive sprocket part intended to connect with the first connecting member C1 for facilitating reassembling the drive sprocket 10.

Aspect 2: An arrangement according to aspect 1, wherein one of said first and second connecting members C1, C2 is a recess C1 and the other of said first and second connecting members C2 is a protrusion C2 configured to engage with said recess C1.

Aspect 3: An arrangement according to aspect 1 or 2, wherein said arrangement A comprising a guiding configuration G1, G2 comprising a first guiding member G1 circumferentially distributed around the support member 20 and a second guiding member G2 circumferentially distributed around the respective drive sprocket part 10A, 10B for facilitating reassembling the drive sprocket 10.

Aspect 4: An arrangement according to any of aspects 1-3, wherein one of said first and second guiding members G1, G2 is a recess G2 and the other of said first and second guiding members G1, G2 is a protrusion G1 configured to engage with said recess G2.

Aspect 5: An arrangement according to aspect 4, wherein said recess G2 is a circumferentially running groove and said protrusion G1 is a circumferentially running ridge.

Aspect 6: An arrangement according to any of aspects 3-5, wherein one of said first and second guiding members G1, G2 is arranged on one side 10c of the support member (20) and the other of said first and second guiding members G1, G2 is oppositely arranged on the respective drive sprocket part 10A, 10B.

Aspect 7: An arrangement according to any of aspects 1-6, said drive wheel DW comprising an outer drive sprocket member S1 arranged on the outer side of the hub member H and an inner drive sprocket member S2 arranged on the inner side of the hub member H.

Aspect 8: A vehicle V comprising an arrangement according to any of aspects 1-7.

The invention claimed is:

1. An arrangement of a drive wheel for an endless track of a tracked vehicle, the drive wheel comprising a hub member and a drive sprocket member attached to the hub member, said drive sprocket member comprising a ring shaped drive sprocket having a set of teeth arranged around the circumference of said drive sprocket, said drive sprocket being configured to engage with said endless track, said drive sprocket member further comprising a support member for said drive sprocket, said drive sprocket being divided into at least two arc shaped drive sprocket parts, each drive sprocket part, in a non engaged state of a drive sprocket part with respect to said endless track, being configured to be exchangeable, said arrangement comprising a guiding configuration comprising a first guiding member circumferentially distributed around the support member and a second guiding member circumferentially distributed around the respective drive sprocket part for facilitating reassembling the drive sprocket, wherein one of said first and second guiding members is a recess and the other of said first and second guiding members is a protrusion configured to engage with said recess and said recess is a circumferentially running groove and said protrusion is a circumferentially running ridge, and wherein the first guiding member circumferentially distributed around the support member and the second guiding member circumferentially distributed around the respective drive sprocket part are configured so that radial control in connection to assembling and/or reassembling of the drive sprocket is obtained.

2. The arrangement according to claim 1, wherein one of said first and second guiding members is arranged on one side of the support member and the other of said first and second guiding members is opposingly arranged on the respective drive sprocket part.

3. The arrangement according to claim 1, wherein each arc shaped drive sprocket part, where the drive sprocket is divided, has a first end portion and a second end portion, each end portion of a drive sprocket part being configured to connect with an end portion of another drive sprocket part so as to form said drive sprocket, said arrangement further comprising a connecting configuration comprising a first connecting member arranged in connection to an end portion of a drive sprocket part and a second connecting member arranged in connection to an end portion of another drive sprocket part intended to connect with the first connecting member for facilitating reassembling the drive sprocket.

4. The arrangement according to claim 3, wherein one of said first and second connecting members is a recess and the other of said first and second connecting members is a protrusion configured to engage with said recess.

5. The arrangement according to claim 1, said drive wheel comprising an outer drive sprocket member arranged on the outer side of the hub member and an inner drive sprocket member arranged on the inner side of the hub member.

6. A vehicle comprising the arrangement according to claim 1.

* * * * *